3,340,049
COPPER BASE ALLOY
Joseph F. Quaas, Island Park, and Daniel P. Tanzman, Far Rockaway, N.Y., assignors to Eutectic Welding Alloys Corporation, Flushing, N.Y., a corporation of New York
No Drawing. Filed Feb. 17, 1965, Ser. No. 433,450
14 Claims. (Cl. 75—154)

ABSTRACT OF THE DISCLOSURE

Alloys for use as overlays and matrixes in welding processes of the copper, copper-nickel and brass type.

---

This invention relates to copper base alloys. More particularly the invention relates to self fluxing copper base alloys which may be used as overlay or matrix alloys in a wide variety of welding processes.

Various copper and copper-nickel alloys have been used for applying overlays to parent materials or as a matrix for hard particles such as refractory carbides. Brass alloys such as nickel-silver have also been used for these purposes but are generally avoided due to their tendency to fume and vaporize when heated. This undesirable property is caused by the zinc content and constitutes a health hazard to operating personnel. Furthermore it is a cause for loss of zinc content in the ultimate alloy which adversely affects the physical characteristics of the deposit. Previously used alloys whether of the copper, copper-nickel or brass type often suffer from excess and uncontrolled fluidity in the heat of the weld making build up or applicability to small, rounded surfaces difficult. When used as a matrix for refractory carbides such alloys also often fail to sufficiently wet the particles to entrap them tightly in the matrix.

An object of this invention is to provide a copper base alloy that can be used to provide a machinable, impact, corrosion and frictional wear resistant overlay on numerous parent materials. A second object of this invention is to provide a remarkably self-fluxing copper base alloy which produces a ductile rather than a brittle deposit. An additional object is to produce an alloy which can be deposited on a suitable base metal by various means including metal spraying, with or without simultaneous fusion, when used in powder form, or by the oxyacetylene, carbon arc, or tungsten inert gas welding processes when used in solid rod or tubular form. A further object of this invention is to provide a copper base alloy which will wet the surface of tungsten carbide particles incorporated therein thereby making the alloy usable in mechanical mixtures with refractory carbide mesh powder. Another object is to provide an alloy for applying heterogeneous deposits wherein refractory carbides are entrapped in the deposited alloy. An alloy usable as a matrix in a composite, cast rod with entrapped carbide particles which can be deposited by the oxyacetylene, carbon arc, tungsten inert gas welding processes is also an object of this invention. Other objects will become apparent as the description proceeds.

The above and other objects of the present invention are accomplished by providing a copper base alloy having the following constituents in the following percents by weight.

|  | Broad, percent | Preferred, percent | Typical, percent |
|---|---|---|---|
| Nickel | 4–30 | 13–22 | 19 |
| Cobalt | 1.0–8 | 2–4.5 | 3.5 |
| Chromium | .40–5 | 1.5–3 | 1.7 |
| Tungsten | .02–3 | .15–.50 | .25 |
| Carbon | .02–.70 | .05–.12 | .07 |
| Silicon | .1–1.5 | 0.4–0.9 | .52 |
| Tin | 1–14 | 5–7 | 6.3 |
| Phosphorus | .05–.55 | .2–.4 | .32 |
| Boron | .10–1.3 | .35–.70 | .51 |
| Iron | Up to 1 | .1–.4 | .15 |
| Copper | Balance | Balance | Balance |

Deposits of the alloys of this invention have indentation hardnesses between Rockwell C 5 and Rockwell C 30. The deposits are crack free, porosity free and are ductile enough to be given a 90° face bend using a one inch mandrel. These properties attributable to the above constituents in the percents recited make the alloys well suited for a variety of overlay uses wherein ductility, wear resistance and machineability is required.

The absence of zinc makes this alloy compatible with an extremely wide range of ferrous and non-ferrous parent materials and well suited for overlays thereon. The overlay can be applied by all types of heating processes including flame spraying without the emission of any poisonous fumes. Another unexpected advantage of the alloy of this invention is its remarkable self-fluxing ability which is so effective that it may be efficiently deposited under normal conditions without the necessity for applying any external fluxing agent. The exact reason for this remarkable self-fluxing action is not konwn but is believed in part attributable to the silicon and boron content. Although one would have believed that the silicon and boron content would make the copper-nickel alloy system very brittle, the resultant alloy of this invention is in fact remarkably ductile and machineable. This is another very unexpected advantage which is possibly a result of the formation of intermetallic compounds although again the exact reasons for these properties are not completely understood.

The alloys of this invention are well suited for use as a matrix alloy in depositing a hard particle containing overlay upon a parent metal to provide highly abrasion and wear-resistant cutting surfaces. Illustrative uses for such overlays include tools for drilling, boring, reaming, and coring, bucket teeth and all sorts of well drilling and mining equipment. When used as a matrix, the alloy of the present invention is soft enough to preferentially wear thereby leaving the hard and sharp edges of the carbide particles protruding in effective cutting positions. At the same time due to its good wetting ability the carbides are entrapped tightly in the matrix and show no substantial tendency to fall out.

Refractory carbides which may be used in the present invention include carbides of numerous refractory metals including titanium, zirconium, vanadium, chromium, molybdenum, tungsten, tantalum and columbium. These refractory carbides may be used alone or in mixtures. Tungsten carbide is particularly effective. Cast tungsten carbide particles provide high resistance to abrasion and wear.

The particle size of the refractory carbides varies in a manner known in the art depending on the ultimate utility desired. Particle sizes 5/16" to 3/8" and angular in shape are normally used for imparting good cutting and drilling performance. Carbide particles in the 20 to 40 mesh range are employed for wear and abrasion resistant applications.

The percentage ratios of refractory carbide particles to matrix alloy according to the invention depend on the individual requirements of the user. As little as 10 percent carbide particles on a weight basis is effective. The maximum carbide particle content is limited by the requirement that sufficient matrix alloy is required to firmly bond the particles in the overlay. As little as 5 percent matrix alloy on a weight basis has been found useful for some applications. Generally, a weight proportion of between 60 and 75 percent carbide particles to 25–40 percent matrix alloy is particularly preferred. An example of an effective composite rod utilizes 65% by weight of cast tungsten carbide particles with 35% by weight of the matrix alloy of the present invention.

The matrix alloy of this invention does not emit poisonous fumes due to its lack of zinc content. Its physical properties are as good or better than those of alloys which utilize zinc. This is unexpected since it has been previously believed essential that such a product include substantial amounts of zinc. The self-fluxing ability of the alloy is also remarkable compared to that of known alloys which contain as much as 3-5% by weight of boron. The reason for this unexpected phenomenon is not known.

No flux is therefore necessary during the ultimate deposition of the alloys regardless of whether hard particles are captured in the matrix to form a composite rod or not. The alloy is compatible with previously deposited copper-nickel alloys including brass or other such alloy systems incorporating zinc making it possible to use the alloy for repairing overlays made by other types of matrix alloys.

The alloy of the present invention combines excellent wetting and flow characteristics with desired sluggishness in the deposition of overlay. Thus when used in flame spraying, with or without simultaneous fusion, a sluggish weld pool is produced. This lack of excess fluidity so common in known copper base alloys allows build up of the deposit and application to small rounded surfaces such as shafts. Due to the nature of the pool, excess run off of the molten pool is avoided.

The alloy system of this invention can be utilized in all forms including rod, powder mesh for spraying or in a paste form in conjunction with various binders. Conventional binders for example organic binders, such as polyethylene, mineral oil or acrylics may be used. Silicate type binders such as those of the water-soluble type are also useful. Such a paste may be applied to the parent material surface which is then heated directly or indirectly by any heating method to form a tough durable wear-resistant overlay.

As a spray powder the alloy may be advantageously utilized in a wide range of particle sizes, for example from 100–325 mesh. Particle sizes lower than 325 mesh may be used but are subject to greater oxidation and are normally avoided. In the powdered form under exceptional circumstances it may also be combined with borate and borate-fluoride type fluxes, particularly for application to parent materials that are oxidized or otherwise difficult to wet such as chromium oxide coated metals. Normally however the self-fluxing properties of the alloy make it unnecessary to apply such fluxes.

The alloy system according to the invention may be utilized in either the homogeneous or heterogeneous form. Homogeneous alloy powders may be formed by melting the required constituents in the percentages specified and forming a powder such as by atomization of the hot melt or grinding of the cooled melt. If rods are to be produced the melt is solidified in appropriate molds.

Heterogeneous forms may be produced such as by mixing various alloy systems in the required proportions to produce an overall powder having the above specified constituents and percentages.

In capturing hard particles in the matrix alloy to form a composite rod, the hard particles may be dispersed in various types of molds such as graphite, steel or ceramic either solid or water cooled. The carbides may be fluxed with a dry flux or paste before heat is applied to prevent them from oxidizing. However if the matrix alloy is placed in the mold prior to the application of heat, its remarkable self-fluxing ability will protect the hard carbide particles. The alloy also may be flame sprayed over carbide particles.

The composite product may be manufactured for example by heating the mold incorporating hard particles and matrix alloy in a batch type furnace to bring the alloy up to its melting point. Heat may alternatively be applied by any heat source such as oxy-fuel gas, induction heating and the like. The absence of any volatile constituents in the matrix alloy prevents its physical properties from being affected when exposed to heat during fabrication and ultimate deposition. Its high retention strength and preferential wear with respect to hard particles makes it extremely effective for applying wear-resistant cutting overlays to a wide variety of drilling, mining and construction equipment.

We claim:

1. A copper base alloy comprising the following constituents in the following ranges of percentages by weight:

| | Percent |
|---|---|
| Nickel | 4–30 |
| Cobalt | 1.0–8 |
| Chromium | .40–5 |
| Tungsten | .02–3 |
| Carbon | .02–.70 |
| Silicon | .1–1.5 |
| Tin | 1–14 |
| Phosphorus | .05–.55 |
| Boron | .10–1.3 |
| Iron | up to 1 |
| Copper | Balance |

2. The copper base alloy of claim 1 wherein the constituents are present in the following percentages by weight:

| | Percent |
|---|---|
| Nickel | 13–22 |
| Cobalt | 2–4.5 |
| Chromium | 1.5–3 |
| Tungsten | .15–.50 |
| Carbon | .05–.12 |
| Silicon | 0.4–0.9 |
| Tin | 5–7 |
| Phosphorus | .2–.4 |
| Boron | .35–.70 |
| Iron | .1–.4 |
| Copper | Balance |

3. The copper base alloy of claim 1 wherein the alloy is powder form.

4. An alloy powder composition comprising refractory carbides in admixture with the copper base alloy of claim 1.

5. The alloy of claim 4 containing from 5 to 90 weight percent of the copper base alloy and from 10 to 95 weight percent of the refractory carbide particles.

6. The alloy of claim 5 wherein the refractory carbide is tungsten carbide and the copper base alloy has a particle size between 100 and 325 mesh.

7. An alloy composition comprising from 10 to 95 weight percent refractory carbides and from 5 to 90 weight percent of powdered copper base alloy having a particle size between 100 and 325 mesh, said copper base alloy consisting essentially of the composition set forth in claim 2.

8. The alloy composition of claim 7 wherein the refractory carbides are tungsten carbides and are present in an amount between 60 and 75 weight percent and the copper base alloy is present in an amount between 25 and 40 weight percent.

9. A composite hard surfacing rod comprising refractory particles incorporated within the copper base alloy of claim 1.

10. The composite hard surfacing rod of claim 9 containing from 5 to 90 weight percent of the copper base alloy and from 10 to 95 weight percent of the refractory carbide particles.

11. The composite hard surfacing rod of claim 10 wherein the refractory carbide is tungsten carbide.

12. A composite hard surfacing rod containing from 10 to 95 weight percent of refractory carbides and from 5 to 90 weight percent of copper base alloy, said copper base alloy consisting essentially of the composition set forth in claim 2.

13. The composite hard surfacing rod of claim 12 wherein the refractory carbides are tungsten carbides and are present in an amount between 60 and 75 weight percent and the copper base alloy is present in an amount between 25 and 40 weight percent.

14. The copper base alloy of claim 2 in heterogeneous powder form having a particle size between 100 and 325 mesh.

References Cited

UNITED STATES PATENTS 2,269,581   1/1942   Crampton et al. _____ 75—159

FOREIGN PATENTS 789,653   6/1956   Great Britain.

DAVID L. RECK, *Primary Examiner.*

W. W. STALLARD, *Assistant Examiner.*